United States Patent [19]
Mackin et al.

[11] Patent Number: 5,262,937
[45] Date of Patent: Nov. 16, 1993

[54] TECHNIQUE FOR PRECISE COLOR-TO-COLOR REGISTRATION IN THERMAL PRINTERS

[75] Inventors: Thomas A. Mackin, Hamlin; William F. Guy, Rochester; Scott L. Auer, Webster, all of N.Y.

[73] Assignee: Eastman Kodak Company, Rochester, N.Y.

[21] Appl. No.: 781,554

[22] Filed: Oct. 22, 1991

[51] Int. Cl.$^5$ .............................. B41J 1/38; B41J 2/32
[52] U.S. Cl. .................. 346/76 PH; 346/1.1; 346/139 D
[58] Field of Search ............... 346/76 PH, 139 D, 1.1; 400/279, 322

[56] References Cited

U.S. PATENT DOCUMENTS

| | | | |
|---|---|---|---|
| 4,621,271 | 11/1986 | Brownstein | 346/76 PH |
| 4,669,900 | 6/1987 | Miyake et al. | 400/322 |
| 4,804,975 | 2/1989 | Yip | 346/76 L |

FOREIGN PATENT DOCUMENTS

| | | | |
|---|---|---|---|
| 0031176 | 2/1984 | Japan | 400/322 |
| 0077967 | 4/1987 | Japan | 400/322 |
| 0207666 | 9/1987 | Japan | 400/322 |
| WO89/02832 | 4/1989 | PCT Int'l Appl. | |

*Primary Examiner*—Benjamin R. Fuller
*Assistant Examiner*—N. Le
*Attorney, Agent, or Firm*—Robert L. Randall

[57] ABSTRACT

There is disclosed a method for providing precise color-to-color registration of color dots in a multicolor proof with a thermal printer comprising a CPU and Printer Controller, a Motion Controller, a writing drum, and a writing head coupled to a translation means. Using the disclosed method, a proof and a dye donor member with a predetermined dye color thereon are mounted on the writing drum. The writing head is then moved to a predetermined start position defined by a sensor at a predetermined position along the translation means which has its optical path blocked by the writing head. The writing head is then moved forward to a predetermined home position which is defined by a next subsequent pulse from a multi-pulse radial position-indicating encoder coupled to the translation means occurring after the writing head leaves the start position. In sequence, the writing drum and then the translation means are accelerated with a separate predetermined substantially constant acceleration until a separate predetermined velocity is obtained. After the predetermined velocity of the translation means is obtained, the printing of color dots on the proof is started upon the receipt of a next subsequent pulse from a multi-pulse radial position-indicating encoder coupled to the writing drum.

24 Claims, 4 Drawing Sheets

(A) $$a_x = \left(\frac{W}{W_{max}}\right)^2 \cdot \left[\frac{n \cdot R_d \cdot a_{x_{max}} \cdot a_{y_{max}} \cdot F_p}{n \cdot R_d \cdot F_p \cdot a_{y_{max}} + 2 \cdot n \cdot R_t \cdot F_s \cdot n_{max} \cdot a_{x_{max}} - 2 \cdot R_t \cdot F_s \cdot n_{max}^2 \cdot a_{x_{max}}}\right]$$

WHERE: n=THE NUMBER OF WRITING LASERS IN A SWATH,
$n_{max}$=MAXIMUM NUMBER OF WRITING LASERS (EXCLUSIVE OF "DUMMY LASERS"),
W=THE ROTATIONAL SPEEED OF THE DRUM IN RPM,
$R_t$ IS THE RESOLUTION OF THE TRANSLATION ENCODER,
$F_s$ IS THE LEAD SCREW FREQUENCY
$F_p$ IS THE PIXEL FREQUENCY (PIXELS/INCH), AND
$R_d$ IS THE RESOLUTION OF THE DRUM ENCODER.

FOR THE GIVEN SYSTEM, $n_{max}$=18, $R_t$=40,000, $R_d$=50,000, $F_p$=1800, $F_s$=20

(B) $$a_x = \left(\frac{W}{W_{max}}\right)^2 \cdot \left[\frac{225 \cdot n \cdot a_{x_{max}} \cdot a_{y_{max}}}{\left(225 \cdot n \cdot a_{y_{max}}\right) + \left(72 \cdot n \cdot a_{x_{max}}\right) - \left(1296 \cdot a_{x_{max}}\right)}\right]$$

TECHNIQUE FOR PRECISE COLOR-TO-COLOR REGISTRATION IN THERMAL PRINTERS

FIELD OF THE INVENTION

The present invention is directed to a technique for synchronizing thermal printer hardware for precise color-to-color registration needed, for example, in four-color printing.

BACKGROUND OF THE INVENTION

In a thermal printer, a dye donor member containing one or more dye colors is disposed between a receiver member, such as a sheet of paper, and a print head assembly formed of one or more thermal elements often referred to as thermal pixels. When a thermal pixel is energized to a certain level, the heat produced therefrom causes a dye color from the dye donor member to be transferred to the receiver member. The receiver member is mounted on an outside surface of a rotatable writing drum. The density (darkness) of the printed dye color is a function of the temperature applied by the thermal pixel to the dye donor member and the length of time the dye donor member is heated by the applied temperature (the energy delivered from the thermal pixel to the dye donor member). Thermal dye transfer printers offer the advantage of true "continuous tone" dye density transfer. This transfer is obtained by selectively varying the energy applied to each thermal pixel which results in a correspondingly selective variable dye density image pixel which is printed on the receiver member.

A first type of print head is formed with a plurality of resistive thermal elements forming the thermal pixels. The plurality of thermal pixels are usually organized into a plurality of groups of thermal pixels. The thermal pixels in each group are simultaneously addressed in parallel, and each group is addressed sequentially one at a time. In this manner, a smaller and less expensive power supply is needed than would be required when all of the thermal pixels are energized at the same time. In this regard see, for example, U.S. Pat. No. 4,621,271 (S. A. Brownstein, issued on Nov. 4, 1996) which describes method and apparatus for controlling a thermal printer arranged with a plurality of groups of thermal pixels. When a group of thermal pixels are addressed, the thermal pixels are each selectively energized and are driven by a constant voltage. More particularly, a technique is described which addresses the thermal pixels of each group a plurality of N times during a line printing period, and each of the thermal pixels of each group is selectively energized when the thermal pixel is addressed. In this manner each thermal pixel supplies thermal energy to the dye donor member which substantially corresponds to a desired dye color density to be reproduced in an image pixel on the receiver member.

A second type of thermal printer employs one or more laser beams which are each selectively energized as the beam impinges or scans each thermal pixel area on the surface of the dye donor member. The heat which is provided as the laser beam impinges the dye donor member in each pixel area determines the density level (amount of dye color transferred) on the receiver member in the pixel area. An exemplary thermal dye transfer printing apparatus using an array of semiconductor diode lasers is disclosed, for example, in U.S. Pat. No. 4,804,975 (K. Yip, issued on Feb. 14, 1989). Means are provided for controlling the laser diodes to produce light and selectively modulate the light from the individual lasers to provide sufficient energy to cause different amounts of dye to transfer from the dye donor member to the receiver member and form pixels with different levels of density.

With laser thermal printers, precise pixel resolution on the receiver member is required under certain conditions as, for example, for creating four-color proofs (defined in the graphic arts industry as the receiver member output from the thermal printer). In order to print dots (micropixels) at, for example, 1800 and 2400 dots per inch (dpi), it is desirable that the laser thermal printer maintain a small fractional part of micropixel resolution. When writing onto, for example, a receiver member wrapped about a writing drum, synchronization of pixel timing must repeat at regular intervals during the four-color proof printing. Slight changes in, for example, rotational speed or pixel timing has a cumulative effect in compromising the accuracy needed for creating the four-color image.

When graphical information, such as photographs or artwork, is printed in a typical publication, a half-tone printing process is used. Half-tone printing is capable of producing a very high fidelity reproduction of a photograph or artwork if various printing parameters are chosen correctly. Therefore, in four-color printing, half-tone dots of different colors have a precise positional relationship to each other. Because of such precise positional relationship between different colored half-tone dots, correct color registration is a requirement for half-tone color proofing. To create color proofs using laser thermal printing technology, a digital proofer (the laser thermal printer (LTP)) prints a single color at a time. Achieving accurate color registration means repeatable, precise positioning of the laser print head for each pass (for each color) during a proof writing process. Registration errors of only a small fraction of an inch can render a proof inaccurate thereby causing the proof to be colorimetrically incorrect or to have objectionable artifacts. Because the LTP printing process involves motion control in multiple axes (e.g., drum rotation and print head movement transverse to the drum rotation) and requires writing resolutions with typical values of, for example, 1800 and 2400 dpi, mechanical methods for achieving precise dot registration are prohibitively expensive and are prone to error due to timing and mechanical tolerance variations. Moreover, such mechanical methods do not allow writing speeds to be changed within a proof or between proofs. The problem is to provide a thermal printer capable of providing precise dot placement with each pass of the printing process.

SUMMARY OF THE INVENTION

The present invention is directed to a technique for providing precise color-to-color registration with a predetermined accuracy needed for providing, for example, a four-color proof in a thermal printer. The present invention is also directed to a positioning method for thermal printer hardware for standard four-color printing which allows (a) faster throughput when multiple images are scattered on a single proof, and (b) precise positioning when the thermal printer writes separations for the same proof at different speeds or uses a different number of lasers.

More particularly, the invention is directed to a method of printing color dots on a multicolor proof with a thermal printer comprising a rotatable writing drum and a writing head which is coupled to a translation means. In a first step the translation means is activated for moving the writing head to a predetermined fixed start position. In a second step, the writing head is moved in a forward direction to a home position defined by the detection of a next subsequent pulse from a first radial position encoder coupled to the translation means after the writing head has reached the predetermined fixed start position in the first step. The first radial positional encoder produces a predetermined plurality of pulses per revolution of the translation means. Simultaneously with the receipt of the next subsequent pulse from the first encoder, the movement of the translation means and the writing head are stopped, where. In a third step, the writing drum is accelerated with a substantially constant acceleration to a predetermined velocity in response to the receipt of the next subsequent pulse from the first radial position encoder in the second step. In a fourth step, the translation means is accelerated with a predetermined substantially constant acceleration to a predetermined velocity in response to the writing drum reaching the predetermined velocity in the third. In a fifth step, a predetermined number of thermal elements in the writing head are selectively energized for starting the printing of color dots of a dye color onto a receiver member mounted on the writing drum in response to the writing drum reaching a predetermined radial position after the translation means has reached the predetermined velocity. In a sixth and final step, the first through fifth steps are repeated for each other dye color needed to form the multicolor proof.

A more detailed version of the method of printing color dots on a multicolor proof with a thermal printer comprising a rotatable writing drum and a writing head which is coupled to a translation means comprises the following steps. In a first step, a receiver member is mounted on the writing drum and a dye donor member containing a predetermined dye color on top of the receiver member while the writing drum and translation means are stationary. In a second step, the translation means is activated for moving the writing head in a reverse direction normal to a rotation of the writing drum until the writing head reaches a predetermined first position. In a third step, the translation means is activated for moving the writing head in a forward direction opposite to the reverse direction in response to the writing drum reaching the predetermined first position in the second step. In a fourth step, a detecting means detects when the writing drum reaches a predetermined second "start" position. In a fifth step, a next subsequent pulse from a first radial position encoder coupled to the translation means is detected after the writing head has reached the predetermined second "start" position in the fourth step. The first radial positional encoder produces a predetermined plurality of pulses per revolution of the translation means. Such next subsequent pulse indicates that the writing head has reached a third "home" position. Simultaneously with the detection of the next subsequent pulse, the movement of the translation means is stopped. In a sixth step, the writing drum is accelerated with a substantially constant acceleration to a predetermined velocity in response to the receipt of the next subsequent pulse from a first radial position encoder coupled to the translation means in the fifth step. In a seventh step the translation means is accelerated with a predetermined substantially constant acceleration to a predetermined velocity in response to the writing drum reaching the predetermined velocity. In an eighth step, a predetermined number of thermal elements in the writing head are selectively energized for starting the printing of color dots of the dye color on the dye donor member onto the receiver member in response to the seventh step. In a ninth and final step, the first through eighth steps are repeated for each of the other dye colors needed to print the multicolor proof.

The invention will be better understood from the following more detailed description taken with the accompanying drawings and claims.

DETAILED DESCRIPTION

Figure 1:
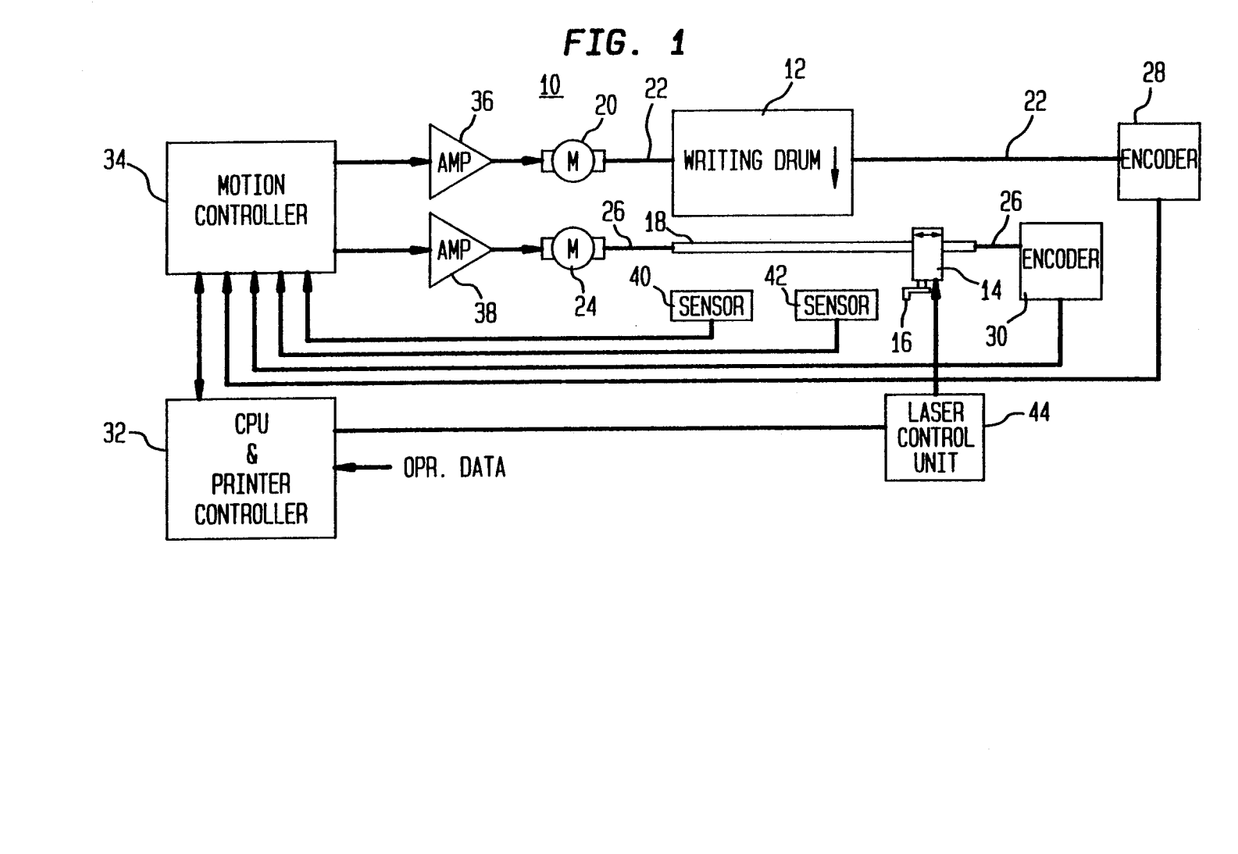
FIG. 1 is a block diagram of a multicolor thermal printer in accordance with the present invention.

Referring now to FIG. 1, there is shown a block diagram of a multicolor thermal printer 10 in accordance with the present invention. The thermal printer 10 comprises a writing drum 12, a writing head 14 including a flag 16 protruding therefrom, translation means 18, a first motor 20 coupled to the writing drum 12 via a shaft 22, a second motor 24 coupled to the translation means 18 via a shaft 26, a first encoder 28 coupled to the shaft 22 of the writing drum 12, a second encoder 30 coupled to the shaft 26 of the translation means 18, a combination Central Processing Unit (CPU) and Printer Controller 32, a Motion Controller 34, a first power amplifier 36, a second power amplifier 38, a first optical sensor 40, a second optical sensor 42, and a laser control unit 44. The CPU and Printer Controller 32 is coupled to receive data from a printer operator (OPR), to bidirectionally communicate with the Motion Controller 34, and to provide control signals to the laser control unit 44. The laser control unit 44 is coupled to receive image data from a Data Interface Module (not shown) and provide control signals to the writing head 14. The Motion Controller 34 is separately coupled to the first motor 20 and the second motor 24 through the first power amplifier 36 and second power amplifier 38, respectively. Additionally, the Motion Controller 34 is coupled to receive separate feedback signals from the first encoder 28, the second encoder 30, the first optical sensor 40, and the second optical sensor 42.

As is known in the art, the writing drum 12 is selectively rotatable in a direction shown by the arrow within the writing drum block 12 in FIG. 1, and preferably comprises a cylindrical outer surface on which a receiver member (not shown and hereinafter referred to as a "proof") is fixedly mounted. A dye donor member (not shown) is then fixedly mounted on the proof before the writing drum 12 is rotated and the proof printing process begins. The proof (not shown) and the dye donor member (not shown) are known components in the thermal printing art. The proof is a sheet of material such as paper or a film. The dye donor member has a form of a web having, for example, a frame of a dye color such as cyan, magenta, yellow or black formed thereon. In four-color printing, one frame of each of the four dye colors (cyan, magenta, yellow and black) is used in a sequential printing process to provide a four-color image on the proof.

The writing head 14 comprises at least one laser (not shown), and preferably an array, or a line, of a plurality of lasers (not shown) for producing beams of light as is well-known in the art. Each of the energized lasers produces a beam of light which has a selective amount of energy. The light beam from each laser is focused onto the dye donor member (not shown) to provide a selective amount of heat at a pixel area on the dye donor member. The selective amount of heat is used to print dots of the dye color with a predetermined density (darkness) on the proof at resolutions within a predetermined range (e.g., 1800–2400 dots per inch).

The translation means 18 causes the writing head 14, with the lasers mounted thereon, to travel in a straight path normal to the direction of rotation of the writing drum 12 while the writing drum is rotating. More particularly, the writing head 14 comprises a carriage (not shown) which is mounted on the translation means 18. The translation means 18 comprises any suitable means such as a lead screw (not shown) which converts the rotation of the second motor 24 in a first or a second opposite direction into a linear motion of the writing head carriage along the translation means 18 in a first or a second opposite direction, respectively, as shown by the bidirectional arrows within the writing head block 14.

The CPU and Printer Controller 32 stores programs and data to, for example, compute parameters which are necessary for printing an image on the proof in response to data supplied by a printer operator (OPR). The printer operator supplied data includes, for example, a printing width, a number of lasers being used, a resolution for the proof (e.g., 2400 dots per inch), etc. It is to be understood that the parameters can change from separation-to-separation on a proof depending on, for example, the number of lasers that are to be used and the speed of the writing drum 12. A "separation" is defined as each of the four color dye images of a four-color proof. More particularly, the CPU and Printer Controller 32 receives the desired printing profile data from the printer operator and calculates the parameters necessary for the thermal printer 10 based on the printing profile data. The CPU and Printer Controller 32 also functions to provide appropriate control signals to the laser control unit 44 during the printing process. The laser control unit 44 functions to convert image data supplied from a Data Input Module (not shown) into corresponding control signals for each laser of the writing head 14 in synchronism with that laser addressing a predetermined pixel location on the dye donor member and proof. The image data includes information relating to, for example, the density of each of the color dots of an original image.

The Motion Controller 34 is programmable and provides the control for both the writing drum 12 and the writing head carriage lead screw (not shown) of the translation means 18. The Motion Controller 34 can comprise any suitable arrangement as, for example, the Galil DMC-520 (Galil) Motion Controller which is commercially available and functions as described hereinafter. In the thermal printer 10, the necessary parameters are downloaded from the CPU and Printer Controller 32 to the Motion Controller 34 for carrying out the desired printing profile. The Motion Controller 34 uses the received parameters to precisely rotate the writing drum 14 and the translation means 18 in synchronism with the lasers forming the light beams to selectively form dots of a particular dye color on the proof. The Motion Controller 34 acts as a slave controller for the CPU and Printer Controller 32, and drives the first power amplifier 36 and the second power amplifier 38 which in turn drive the first motor 20 and the second motor 24, respectively. More particularly, the CPU and Printer Controller 32 downloads the operating programs and profile parameters to the Motion Controller 34, and then enables the appropriate programs as a function of the desired image position on the proof mounted on the writing drum 12.

The Motion Controller 34 receives feedback signals (e.g., pulses) from each of the first encoder 28 and the second encoder 30 which indicate the radial position (e.g., one pulse for each of many radial positions per revolution) of each of the first motor 20 and the second motor 24, respectively. The encoders 28 and 30 are known elements in the art. The Motion Controller 34 further receives feedback signals from the first optical sensor 40 and the second optical sensor 42 which are positioned at predetermined positions along the translation means 18 adjacent to the path of the writing head 14. The first and second optical sensors 40 and 42 can comprise any suitable arrangement such as optical or electromagnetic sensors, and preferably comprise optical "horseshoe" sensors which provide a first signal when the optical path between the open ends of the "horseshoe" is not obstructed and a second signal when the optical path between the open ends of the "horseshoe" is obstructed. The mechanical flag 16 is mounted on the carriage of the writing head 14 so as to obstruct the optical path between the open ends of the first or second "horseshoe" sensors 40 or 42 when the writing head 14 is positioned at a predetermined location adjacent the sensor.

The first optical sensor 40 is hereinafter referred to as the "home sensor" and is positioned to provide the second signal when the writing head 14 is at a predetermined start position (left-hand margin of a proof) which is hereinafter designated the "home" position. The second optical sensor 42 is hereinafter referred to as the "scatter home sensor" and is positioned so as to provide the second signal when the writing head 14 is at a predetermined intermediate start position (e.g., mid-point of a proof) which is hereinafter designated the "scatter home" position. Using the second optical scatter home sensor 42 allows the writing head 14 to travel a shorter distance for proofs containing multiple images, thus increasing writing throughput for "scatter" proofs. More particularly, a "scatter" proof is one where a plurality of small images are printed on one proof at separate times. For example, during a first period of time it is desired to print two small images on the proof, and during a second period of time to print three other small images are desired on the same proof. Under such condition, the thermal printer 10 is programmed to print the two small images (e.g., above and below each other) in the column of the proof between the "home sensor"

40 (left-hand margin of the proof) and the "scatter home sensor" 42 during the first period of time. During the second period of time, the thermal printer 10 is programmed to print the three other small images in the column between the "scatter home sensor" 42 and the right-hand margin of the proof. Although it would be advantageous to print all of the exemplary five small images at one time, there are many occasions where the work flow to the thermal printer 10 from one or many people requires that the images be printed in the scattered arrangement on a proof for improved cost and efficiency.

When the Motion Controller 34 determines that the writing head 14 is in a proper position to carry out the desired printing profile, as indicated by the downloaded parameters from the CPU and Printer Controller 32 and from signals from the sensors 40 and 42 and the encoders 28 and 30, the Motion Controller 34 transmits a signal to the CPU and Printer Controller 32. The CPU and Printer Controller 32 then starts the printing process to produce a proof.

Figure 2:
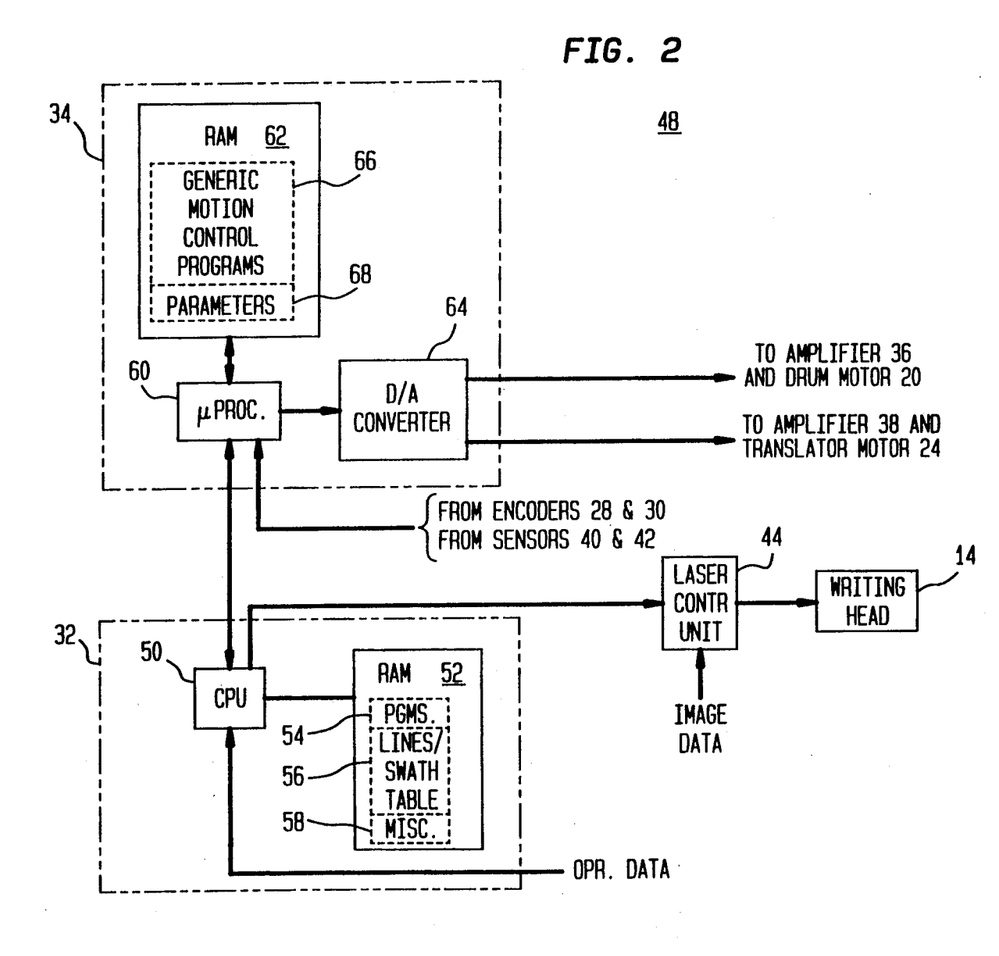
FIG. 2 is a block diagram of the control system of multicolor thermal printer of FIG. 1.

Referring now to FIG. 2, there is shown a preferred embodiment of a control system 48 used to produce the mode of operation of the multicolor thermal printer 10. FIG. 2 shows, in block diagram form, a preferred embodiment of the CPU and Printer Controller 32 (shown within a dashed line rectangle), and the Motion Controller 34 (shown within a dashed line rectangle). Outputs from the Motion Controller 34 are coupled to the drum motor 20 and the translation means motor 24 through the first power amplifier 36 and the second power amplifier 38, respectively. An output from the CPU and Printer Controller 32 is coupled to the writing head 14 through the laser control unit 44. Each of these elements is identified with the same number used for the corresponding elements shown in FIG. 1.

The CPU and Printer Controller 32 comprises a Central Processing Unit (CPU) 50, a Random Access Memory (RAM) 52, and a plurality of electronic devices (not shown) which, for example, are described in detail in a co-pending U.S. patent application Ser. No. 749,031 entitled "A Method Of Calibrating a multichannel Printer" (K. M. Sanger, et al., filed on Aug. 23, 1991). The co-pending Patent Application has a common assignee with the present patent application, and is incorporated herein by reference. The RAM 52 stores (a) programs (PGMS) in a first section 54 thereof, (b) an electronic table (lines/swath table) in a second section 56 thereof, and (c) miscellaneous or scratchpad data in a third section 58 thereof. The programs and data stored in the RAM 52 are needed by the CPU 50 to, for example, determine the printing parameters in response to printing profile data supplied by a printer operator to the CPU 50.

The laser control unit 44 comprises a data interface module, channel driver boards, and laser driver boards all of which are not shown but are described in detail in the aforementioned co-pending U.S. Patent Application. The laser control unit 44 functions to receive image data relating to the density of each color at each pixel area of an original image to be printed, and provide correctly timed signals to the lasers of the writing head 14 indicating the density of a dye color being printed for corresponding pixel areas on the proof.

The Motion Controller 34 comprises a microprocessor 60, a RAM 62, and a Digital-to-Analog (D/A) converter 64. The D/A converter 64 converts digital signals from the microprocessor 60 to analog signals that are interpreted by the amplifiers 36 and 38. The RAM 62 includes a first section 66 which stores general motion control programs which are initially downloaded from the CPU 50 of the CPU and Printer Controller 32. It is to be understood that the general motion control programs downloaded from the CPU 50 to the microprocessor 60 remain essentially the same for all proofs to be printed. The parameters for a desired profile which are downloaded from the CPU 50 of the CPU and Printer Controller 32 are stored in a second section 68 of the RAM 62.

In operation, the CPU and Printer Controller 32 is initially responsive to an operator (OPR) of the thermal printer 10 of FIG. 1. The printer operator makes a selection of, for example, a particular screen ruling and screen angle for a half-tone pattern. Data from the printer operator is stored, for example, in the miscellaneous section 58 of the RAM 52. The CPU and Printer Controller 32, using conventional control circuitry, transmits the half-tone pattern selection provided by the printer operator to a program in a first section (PGMS) 54 (shown within a dashed line rectangle) of the RAM 52 which interrogates a lines/swath table in a second section 56 (shown in a dashed line rectangle) of RAM 52. It is to be understood that the lines/swath table of section 56 is stored in the RAM 52 (as shown) or in a conventional electronic memory which is loaded with a collection of lines per swath ratios. These ratios are tabulated against various half-tone dot patterns. The information contained in the lines/swath ratio table in section 56 of RAM 52 is empirically determined when a first one of a particular model of the thermal printer 10 is constructed. A series of trial printings is made for each half-tone dot pattern, where each trial printing is made with a different line per swath ratio. The results of the trial printings are assessed, and an optimum line per swath ratio is selected for the particular half-tone dot pattern. The choice of the line per swath ratio involves selecting that ratio which produces the lowest printing time without permitting the thermal printer 10 to produce visible banding that results from interaction of the incremental dots and the half-tone dots. The results of the experiments are placed into the lines/swath table in the section 56 of the RAM 52.

After the proper line per swath ratio is selected from the lines/swath table stored in section 56 of RAM 52, output information from this table is transmitted to the laser control unit 44 via the CPU 50, and to a "translator speed to drum speed calculator" program in the Programs section 54 of RAM 52. The printing parameters determined by the "translator speed to drum speed calculator" program are transmitted to the Parameters section 68 in the RAM 62 of the Motion Controller 34 via the CPU 50 and microprocessor 60. The parameters for each proof can change based on the results of the "translator speed to drum speed calculator" program.

The laser control unit 44 is conditioned to enable the writing head 14 to print with only the number of lasers that is selected from the lines/swath table of section 56 of the RAM 52. For example, consider the case where the writing head 14 contains 18 lasers, but the lines/swath table selects thirteen lines per swath as the optimum ratio for a particular half-tone dot pattern. In that case, the laser control unit 44 is set up to write with only thirteen of the eighteen lasers in the writing head 14. It is to be understood that with each revolution of the writing drum 12, the writing head 14 produces one swath of the image.

Figure 3:
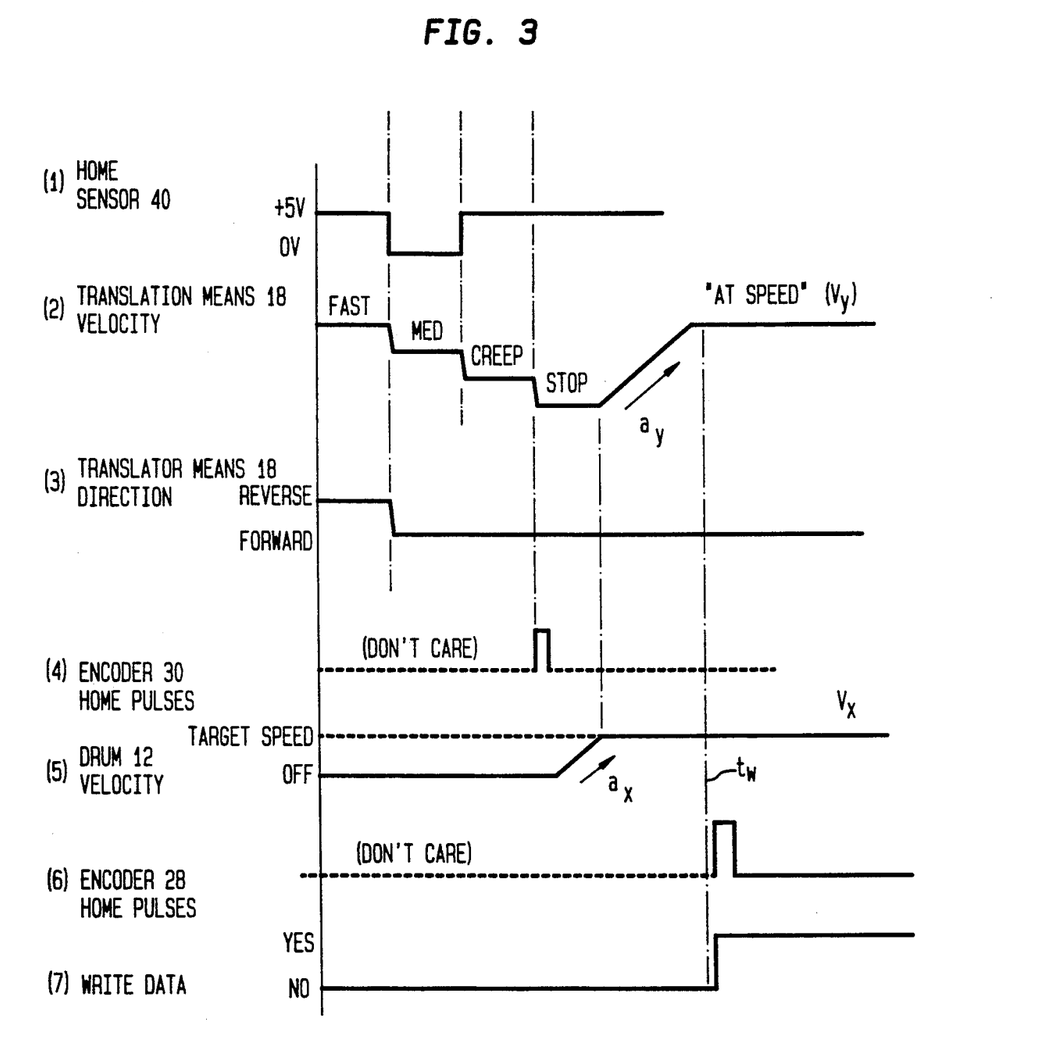
FIG. 3 is a timing diagram for obtaining precise color-to-color registration in the multicolor thermal printer of FIG. 1 in accordance with the present invention.

Referring now to FIG. 3, there is shown a pulse and timing diagram for the home sensor 40, the translation means 18, the translator encoder 30, the writing drum 12, and the CPU and Printer Controller 32 of the multicolor thermal printer 10 of FIG. 1. The sequence of events depicted in FIG. 3 are used to produce precise color-to-color registration of the printed dots of a proof in accordance with a preferred embodiment of the invention. The first line at the top of FIG. 3 shows the output signal level (0 or +5 volts) of the home sensor 40 during the start-up for printing a due color image. The +5 volt level occurs when the optical path of the home sensor 40 is not blocked by the flag 16, and the 0 volt level occurs when the optical path of the home sensor 40 is blocked by the flag 16. The second line of FIG. 3 shows the rotational velocity of the translation means 18 during various time periods of the thermal printing process. The third line of FIG. 3 shows the direction of rotation of the translation means 18 during various period of time of the thermal printing process. The fourth line of FIG. 3 shows a "home" pulse of the plural pulses per revolution produced by the second encoder 30 coupled to the shaft 26 of the translation means 18. The fifth line of FIG. 3 shows the velocity of the writing drum 12 during various time periods of the thermal printing process. The sixth line of FIG. 3 shows a "home" pulse of the plural pulses per revolution produced by the first encoder 28 coupled to the shaft 22 of the writing drum 12. The seventh (bottom) line, denoted as "write data", of FIG. 3 shows when the CPU and Printer Controller 32 causes the lasers of the writing head 14 to begin the printing of the color dots on the proof.

The sequence of operation begins as the writing hardware is readied to begin a next proof, with the writing drum 12 not rotating (indicated as "off" in the fifth line of FIG. 3). A proof (receiver member) is wrapped on the writing drum 12, and a dye donor member sheet including a predetermined dye color is mounted on top of the proof. The Motion Controller 34 is activated to move the writing head 14 at a fast velocity back (reverse direction) towards the "home" position as shown by the translation means 18 velocity and direction lines (the second and third lines) of FIG. 3. When the flag 16 obstructs the optical path between the "horseshoe" ends of the home sensor 40, the home sensor changes its output signal from a +5 volt value to a 0 volt value (see the first line of FIG. 3). The Motion Controller 34 senses the change in the first home sensor 40 output signal and changes the velocity and direction of the translation means 18 lead screw to a medium velocity and forward rotational direction, respectively, as shown in the respective second and third lines of FIG. 3. Such change of direction of the translation means, in turn, causes the writing head 14 to also move in a forward direction. During this time period, numerous pulses from the first and second encoders 28 and 30 indicating the radial position of the writing drum 12 and the translation means 18, respectively, are received by the Motion Controller 34, but are ignored as shown in the fourth and sixth lines of FIG. 3.

There is necessarily some finite delay time in reversing the direction of the translation means 18. The output signal from the first home sensor 40 (shown in the first line of FIG. 3) stays low (0 volts) until the flag 16 on the carriage of the writing head 14 no longer blocks the optical path between the "horseshoe" ends of the first home sensor 40. The transition from 0 volts to ±5 volts of the output signal from the first home sensor 40 indicates that the carriage of the writing head 14 is now past the "home" position at the left-hand side of the proof. In response to the transition of the home sensor 40 output signal going from 0 volts to +5 volts, the Motion Controller 34 slows the translation means 18 to a "creep" velocity as shown in the second line of FIG. 3, and waits for the detection of a next second encoder 30 "home pulse" as shown in the fourth line of FIG. 3. At the detection of this translator encoder 30 "home pulse", the Motion Controller 34 stops the motor 24 driving the translation means 18 as shown in the second line of FIG. 3. The carriage of the writing head 14 is now in a precise, known position to start the printing of a proof.

After the detection of the encoder 30 "home pulse", the Motion Controller 34 actuates the motor 20 to rotate the writing drum 12 with increasing acceleration (denoted by the arrow and $a_x$) as shown in line 5 of FIG. 3. When the writing drum 12 is at its target speed, $v_x$, (as shown of the fifth line of FIG. 3), the Motion Controller 34 actuates the motor 24 to rotate the translation means 18 with increasing acceleration in the forward direction (see the second and third lines of FIG. 3). When the lead screw of the translation means 18 is at a predetermined velocity, $v_y$, shown as "at speed" (see the second line of FIG. 3), the Motion Controller 34 awaits the detection of a next radial position pulse from the first encoder 28 coupled to the writing drum 12. At the detection of this next radial position pulse from the first encoder 28, the Motion Controller 34 enables the CPU and Printer Controller 32 to initiate the writing of the data with the lasers of the writing head 14 (see bottom line of FIG. 3). Writing continues until the printing of a subsection or the entire proof is completed, at which time the motors 20 and 24 are stopped. A new dye donor member sheet including a second different dye color is mounted on top of the proof, and the printing process, as shown in FIG. 3 is then repeated for precisely positioning dots of this second dye color on the already printed image(s) of the first dye color on the proof. The process is again repeated for each of the other third and fourth dye colors to complete a four-color, half-tone printed image or images.

As stated hereinbefore, the CPU and Printer Controller 32 includes a "translator speed to drum speed calculator" in section 66 of the RAM 62. Based on the parameters for a next separation, the calculations of the control setpoints are completed with a maximum of precision in order to achieve both dimensional accuracy and pass-to-pass registration accuracy of the color dots in an output four-color image. It is to be understood that the velocity, $v_x$, of the writing drum 12 shown in FIG. 3 is an independent variable in the thermal printer 10. The speed must be maximized for printer 10 productivity, but is limited by the thermal response of the dye donor member. More particularly, each color of a dye donor member has a maximum writing drum speed at which an "aim" (e.g., maximum) density can be produced. The Galil DMC-520 Motion Controller 34 maintains the speed of the writing drum 12 in response to the signals received via the feedback loop from the drum encoder 28. The desired writing drum 12 speed [given in revolutions per minute (RPM)] is converted into pulses per second by the drum encoder 28. For a given rotational speed, W, of the writing drum 12 expressed in revolutions per minute, the control parameter for the writing drum velocity, $v_x$, is derived from the equation:

$$v_x = (W)(R_d)/60 \qquad (1)$$

where $R_d$ is the resolution of the drum encoder 28 in pulses per revolution (PPR) which for the exemplary case used hereinafter is 50,000 PPR. Equation (1) can be simplified to:

$$v_x = (W)(K_d) \qquad (2)$$

where $K_d = R_d/60 = 2500/3$ for the exemplary case and is a fixed number for a particular configuration of the thermal printer 10.

The velocity, $v_y$, of the translation means 18 is dependent on the velocity, $v_x$, of the writing drum 12 and the swath width. A swath width is defined as the width of adjacent dots printed during one rotation of the writing drum 12, and is dependent on the number of lasers of the writing head 14 that are concurrently used. In order to write sequential swaths adjacent to each other during subsequent revolutions of the writing drum 12, the writing head 14 must traverse a distance of one swath width during each rotation of the writing drum 12. The writing head 14 is mechanically coupled to a rotational lead screw (not shown) of the translation means 18 having a predetermined pitch of, for example, 0.050 inches per revolution. Such pitch is also expressed as a lead screw frequency of 20 revolutions per inch. The lead screw of the translation means 18 is coupled to a translation encoder 30 generating, for example, 10,000 pulses per revolution. These pulses are preferably bi-phase decoded to result in 40,000 pulses per revolution as interpreted by the Galil DMC-250 Motion Controller 34. The Motion Controller 34 uses the decoded pulses to properly maintain the velocity, $v_y$, of the translation means 18. Based on the above-described exemplary fixed information for the thermal printer 10, the parameter for the velocity, $v_y$, of the translation means 18 is expressed by the equation:

$$v_y = [(R_t)(F_s)(S_s)(S_r)]/T \qquad (3)$$

where $R_t$ is the resolution of the translation means encoder 30 in pulses per revolution, $F_s$ is the lead screw frequency in revolutions per inches, $S_s$ is the swath width in inches per swath, $S_r$ is the swaths per revolution which equals the numeral one, and T is the rotational period of the writing drum 12 in seconds per revolution. Since $T = 60/W$, $S_s = n/F_p$ where n is the number of active lasers per swath, and $F_p$ is the output pixel spacial frequency (e.g., 1800 pixels/inch), equation (3) can be simplified to:

$$\begin{aligned} v_y &= [(R_t)(F_s)(n/F_p)]/(60/W) \\ &= [(n)(W)[(R_t)(F_s)]/(60)(F_p)] \\ &= (n)(W)(K_t) \end{aligned} \qquad (4)$$

where
$K_t = (R_t)(F_2)/(60)(F_p) = (40000)(20)/(60)(1800) = 200/2$-
7, and n is the number of writing lasers used in printing a swath during a rotation of the writing drum 12.

If the writing drum 12 and the translation means 18 are allowed to accelerate at a fixed rate to a variable velocity, this results in the image writing beginning at a different position for each different writing drum velocity. Such condition produces an unacceptable amount of dot mis-registration between passes of the writing head 14 over the proof. The distance, $s_y$, traveled by the translation means 18 during a time period (t) of acceleration $a_y$, $a_y(t)$, is equal to the integral between $t = t_1$ and $t_w$ of $v_y(t)dt$. Similarly the velocity during the period of acceleration, $v_y(t)$, is equal to the integral between $t = t_1$ and $t_w$ of $a_y(t)dt$. Since the distance traveled and the velocity of the translation means 18 are each zero at $t = 0$, the above expressions are simplified to the equations:

$$s_y(t) = a_y t^2/2, \text{ and} \qquad (5)$$

$$v_y(t) = a_y t \qquad (6)$$

From equation (6), the time interval needed to accelerate to writing speed is expressed as:

$$t_y = v_y/a_y \qquad (7)$$

By substituting equation (7) into equation (5), the distance traveled by translation means 18 during constant acceleration is expressed as:

$$s_y = v_y^2/2a_y \qquad (8)$$

In order to keep the transitional distance during acceleration constant, the acceleration, $a_y$, of the translation means 18 has to vary at a rate that is inversely proportional to the change of the square of the translational velocity, $v_y$. Further, there is a physical limit to a given configuration of the translation means driving motor 24, power amplifier 38 capacity, and translation means 18 inertia which determines the shortest time, $t_{y(min)}$, over which the Galil DMC-520 is capable of controlling the acceleration of the translation means 18. The minimum time is defined by the equation:

$$t_{y(min)} = v_{y(max)}/a_{y(max)} \qquad (9)$$

Substituting equation (9) into equation (5) produces the equation:

$$s_y = v_{y(max)}^2/2a_{y(max)} \qquad (10)$$

The acceleration of the translation means 18 is expressed as a function of the writing velocity of the translation means 18 in order to start writing at the same translational position on the writing drum 12 by the equation $$a_y = (v_y^2)(a_{y(max)}/v_{y(max)}) \qquad (11)$$

In equation (4), the translational velocity, $(v_y)$, is expressed as a function of the rotational speed, W, of the writing drum 12 and the number, n, of active lasers for a given pass. The maximum translational velocity results from both the maximum of the number of lasers and the writing drum speed, wherein equation (11) is simplified to $$a_y = (n^2)(W^2)(a_{y(max)}/[(n_{(max)})^2(W_{(max)})^2] \qquad (12)$$

where $n_{(max)}$ is, for example, equal to eighteen for the thermal printer 10. The values of $a_{y(max)}$ and $W_{(max)}$ are chosen based on the properties of the dye donor member and the hardware configuration of the translation means 18.

Once the translation means 18 has reached the proper speed, the electronics of the CPU and Printer Controller 32 and the Motion Controller 34 allows the writing of the pixel dots on the receiver member to begin based on a next occurrence of a next rotational position pulse (e.g., a positional "home pulse") of the encoder 28 coupled to the shaft 22 of the writing drum 12 as shown in the bottom two lines of FIG. 2. It is to be understood that variations in the position of the writing drum 12 as the translation means 18 reaches the writing speed causes a translational mis-registration to be induced while waiting for a subsequent drum encoder 28 positional "home pulse" to occur. Such translational mis-registration is eliminated in accordance with the present invention by controlling the position of the writing drum 12 as accumulated during the time leading up to the reaching of the writing speed.

The distance travelled by the writing drum 12 consists of two sections: (a) the distance travelled during a first time period, $t_x$ between the times to and $t_1$, over which the writing drum 12 is accelerating and the translation means 18 is stationary as characterized by the expression $s_x(t) = a_x t^2/2$ or $s_x = v_x^2/2a_x$, and (b) the distance traveled during a second time period, $t_y$ between $t_1$ and $t_W$, over which the writing drum 12 is held to a constant velocity and the translation means 18 is accelerating up to writing speed as characterized by the expression of $s_x(t) = v_x t$. Since $t_y$ is defined in equation (7) as equal to $v_y/a_y$, the total distance traveled by the writing drum 12 during the first and second sections is:

$$s_x = v_x^2/2a_x + (v_x)(v_y)/a_y \tag{13}$$

Solving equation (13) for $a_x$ yields the equation:

$$a_x[(v_x^2)(a_y)]/[(2s_x a_y) - (2v_x v_y)] \tag{14}$$

It is to be understood that the rotational subsystem of the writing drum 12 has characteristic limits in the same manner that the acceleration of the translation means 18 has physical limitations. Substituting such characteristic limits into equation (13) yields the equation:

$$s_x = v_{x(max)}^2/2a_{x(max)} + (v_{x(max)})(v_{y(max)})/a_{y(max)} \tag{15}$$

Figure 4:
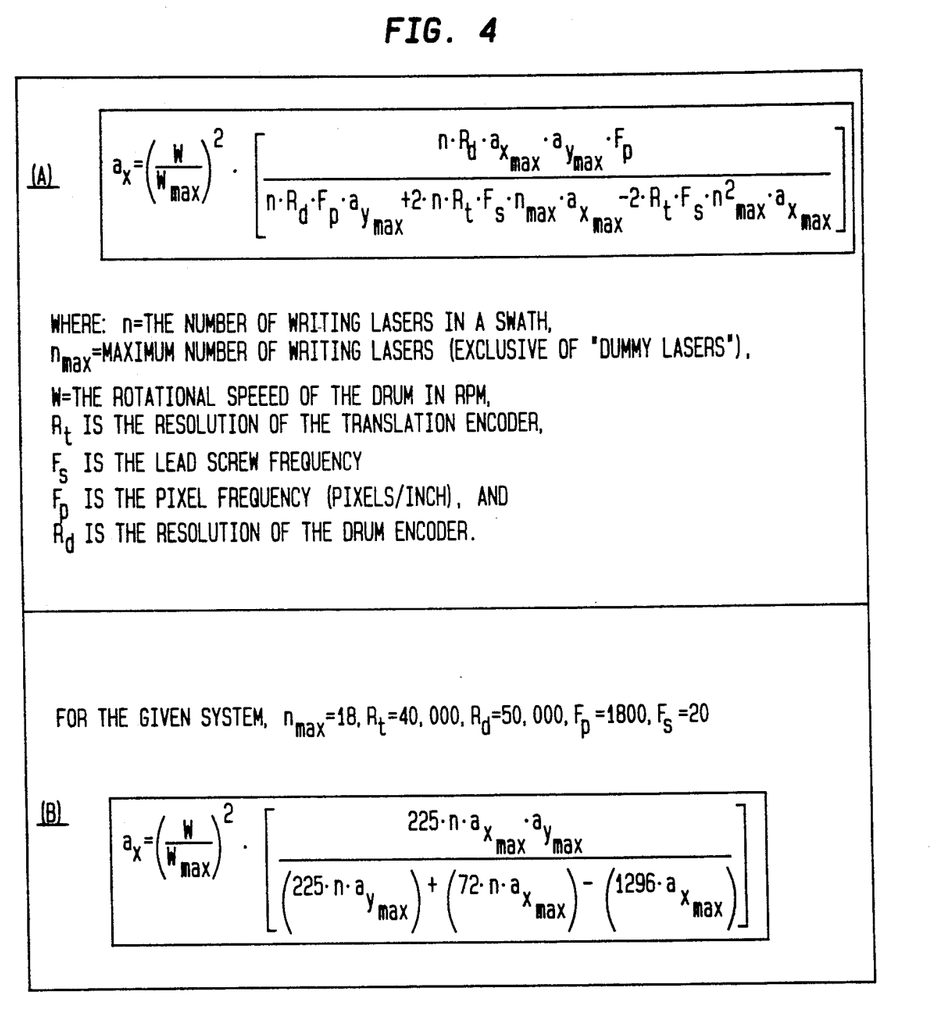
FIG. 4 is a Table of a general equation and an equation for a specific parameters of the thermal printer of FIG. 1 for calculating the acceleration of the writing drum; and The drawings are not necessarily to scale.

Substituting the value of $s_x$ from equation (15) into equation (14); multiplying the numerator and denominator by $[(a_{x(max)})(a_{y(max)})]$; using the relationships defined in equations (2), (4) and (12); combining like terms; and substituting system values that drive $K_d$ and $K_t$ provides a general equation for $a_x$ which is shown in Part A of the Table in FIG. 4. For a thermal printer 10 having the parameters: a maximum number of lasers of $n_{max} = 18$, a resolution of translation encoder 30 of $R_t = 40,000$, a resolution of the writing drum encoder 28 of $R_d = 50,000$, a pixel frequency of $F_p = 1800$, and a lead screw frequency of $F_s = 20$, the final writing drum 12 acceleration, $a_x$, is expressed by the equation which is shown in Part B of the Table in FIG. 4. An additional system parameter that must be chosen is $a_{x(max)}$, which value is dependent on the inertia of the writing drum 12, and the capacity of the drive electronics for the motor 20. Mis-registration errors introduced by programming the Galil DMC-520 motion controller 34 can be reduced to insignificant distances. The values selected for the velocity and the acceleration for both the writing drum 12 and the translation mean 18 must account for coordinated motion. The values selected become especially critical if an image is to be produced using different speeds of the writing drum 12 to compensate for a first fast speed and a second slower speed needed for each different dye doner member on a pass-to-pass basis.

It is appreciated and understood that the specific embodiments of the invention described hereinabove are merely illustrative of the general principles of the invention. Various modifications may be made by those skilled in the art which are consistent with the principles set forth. For example, additional optical sensors can be included along the translation means 18 for providing additional subsections of a proof.

What is claimed is:

1. A method of printing color dots on a multicolor proof with a thermal printer comprising a rotatable writing drum and a writing head which is coupled to a translation means for moving the writing head comprising the steps of:
   (a) activating the translation means for moving the writing head to a predetermined fixed start position;
   (b) activating the translation means for moving the writing head in a forward direction to a home position defined by a detection of a next pulse from a first radial position encoder coupled to the translation means after the writing head has reached the predetermined fixed start position in step (a), and simultaneously therewith deactivating the translation means for stopping the movement of the writing head, where the first radial position encoder produces a first predetermined plurality of pulses per revolution of the translation means;
   (c) accelerating the writing drum with a first predetermined substantially constant acceleration until the writing drum reaches a first predetermined velocity in response to a receipt of the next pulse from the first radial position encoder in step (b);
   (d) accelerating the translation means with a second predetermined substantially constant acceleration until the translation means reaches a second predetermined velocity in response to the writing drum reaching the first predetermined velocity in step (c);
   (e) selectively energizing a predetermined number of thermal elements in the writing head for starting the printing of color dots or a dye color onto a receiver member mounted on the writing drum in response to the writing drum reaching a predetermined radial position after the translation means has reached the second predetermined velocity; and
   (f) repeating steps (a) through (e) for each other dye color needed to print the multicolor proof.

2. The method of claim 1 wherein in step (a), performing the substeps of:
   (a1) moving the writing head in a reverse direction towards a predetermined fixed pre-start position;
   (a2) detecting when the writing head has reached the predetermined fixed pre-start position using an optical sensor positioned at a predetermined location along a travel of the writing head; and
   (a3) moving the writing head from the predetermined fixed pre-start position in the forward direction until the predetermined fixed start position is reached.

3. The method of claim 2 wherein:
   in step (a2), detecting when the writing head has reached the predetermined fixed pre-start position when an optical path of the optical sensor is blocked by an extension protruding from the writing head; and in step (a3), moving the writing head in a forward direction in response to the optical path of the optical sensor being blocked in step (a2) until the optical path of the optical sensor is no longer blocked for sensing that the writing head has reached the predetermined fixed start position.

4. The method of claim 2 wherein in performing step (a3), moving the writing head with a creeping velocity.

5. The method of claim 1 wherein in performing step (c) rotating the writing drum with the first predetermined substantially constant acceleration, $a_x$, as determined from the following expression:

$$a_x = \frac{(W/W_{max})^2[nR_d a_{xmax} a_{ymax} F_p]}{[nR_d F_p a_{ymax}] + [2nR_t F_s n_{max} a_{xmax}] - [2R_t F_s n_{max}^2 a_{xmax}]}$$

where:

n = a number of writing lasers used in the writing head in a swath, $n_{max}$ = a maximum number of writing lasers mounted in the writing head (exclusive of any dummy lasers), w = a rotational speed of the writing drum in RPM, $R_t$ = a resolution of the first radial position encoder coupled to the translation means in pulses per revolution, $F_s$ = a frequency of the translation means in revolutions per inch of travel of the writing head, $F_p$ = a value for a number of pixels per inch to be printed, $R_d$ = a revolution of a second encoder coupled to the writing drum in pulses per revolution, $a_{xmax}$ = a characteristic physical limit of a system for rotating the writing drum, and $a_{ymax}$ = a characteristic physical limit of a system for rotating the translation means.

6. The method of claim 1 wherein in performing step (d) rotating the translation means with the second predetermined substantially constant acceleration, $a_y$, as determined from the following expression:

$$a_y = (n^2)(W^2)[a_{ymax}/(n_{max}^2)(W_{max}^2)]$$

where:

n = a number of writing lasers used in printing a swath,

W = a rotational speed of the writing drum in RPM, $W_{max}$ = a maximum rotational speed of the writing drum (RPM), $n_{max}$ = a maximum number of lasers writing lasers (excluding dummy lasers), and $a_{ymax}$ = a characteristic physical limit of a system for rotating the translation means.

7. The method of claim 1 wherein in performing step (e), starting the printing of the color dots in response to a detection of an initial transition of the next pulse received from a second radial position encoder coupled to the writing drum after the translation means reached the second predetermined velocity in step (d), where a second radial positional encoder produces a second predetermined plurality of pulses per revolution of the writing drum.

8. The method of claim 1 comprising the further steps of:

(g) prior to performing step (a), mounting a receiver member on the writing drum, and a dye donor member containing a predetermined dye color on tope of the receiver member, while the writing drum and translation means are stationary.

9. The method of claim 1 wherein in step (e) the thermal elements are individual lasers which are focused onto a dye donor member containing the dye color which is mounted on top of the receiver member.

10. A method of printing color dots of a predetermined dye color with a thermal printer comprising a rotatable writing drum, and a writing head which is coupled to a translation means for moving the writing head to print a multicolor proof comprising the steps of:

(a) activating the translation means for moving the writing head in a forward direction from a predetermined start position to a predetermined home position before deactivating the translation means for stopping the movement of the writing head, the home position being defined by a receipt of a next pulse from a first encoder which is coupled to the translation means and provides a first predetermined plurality of pulses associated with separate equally-spaced radial positions per revolution of the translation means;

(b) activating a driving means coupled to the writing drum in response to the next pulse obtained in step (a) from the first encoder coupled to the translation means for rotating the writing drum with a first predetermined substantially constant acceleration until a first predetermined writing drum velocity is achieved;

(c) activating the translation means with a second predetermined substantially constant acceleration for moving the writing head in the forward direction until a second predetermined velocity is reached in response to the writing drum reaching the first predetermined writing drum velocity;

(d) starting the printing of the predetermined dye color dots in a multicolor proof by a thermal printer in response to detecting the next pulse from a second encoder coupled to the writing drum after the translation means reaches the second predetermined velocity, the second encoder coupled to the writing drum providing a second predetermined plurality of pulses associated with separate equally-spaced radial positions of the writing drum; and (e) repeating steps (a) to (d) for each subsequent different color dye to print the multicolor proof.

11. The method of claim 10 wherein in performing step (a), performing the substeps of:

(a1) moving the writing head in a reverse direction towards the predetermined start position;

(a2) sensing when the writing head has reached the predetermined start position using an optical sensor positioned at a predetermined location along a travel of the writing head; and (a3) moving the writing head in the forward direction until the home position is reached.

12. The method of claim 11 wherein in performing the substeps of:

(i) moving the writing head in the reverse direction until an optical path of an optical sensor is blocked by an extension protruding from the writing head; and (ii) moving the writing head in the forward direction in response to the optical path of the optical sensor being blocked in step (i) until the optical path of the optical sensor is no longer blocked for sensing that the writing head has reached the predetermined start position.

13. The method of claim 11 wherein in performing step (a3), moving the writing head with a creeping velocity.

14. The method of claim 10 wherein in performing step (b) rotating the writing drum with the first predetermined substantially constant acceleration, $a_x$, as determined from the following expression:

$$a_x = \frac{(W/W_{max})^2[nR_d a_{xmax} a_{ymax} F_p]}{[nR_d F_p a_{ymax}] + [2nR_t F_s n_{max} a_{xmax}] - [2R_t F_s n_{max}^2 a_{xmax}]}$$

where:

$n$ = a number of writing lasers in the writing head in a swath, $n_{max}$ = a maximum number of writing lasers mounted in the writing head (exclusive of any dummy lasers), $W$ = a rotational speed of the writing drum in RPM, $R_t$ = a resolution of the first encoder coupled to the translation means in pulses per revolution, $F_s$ = a frequency of the translation means in revolutions per inch of travel of the writing head, $F_p$ = a value for a number of pixels per inch to be printed, $R_d$ = a resolution of the second encoder coupled to the writing drum in pulses per revolution, $a_{xmax}$ = a characteristic physical limit of a system for rotating the translation means.

15. The method of claim 10 wherein in performing step (b) rotating the translation means with the second predetermined substantially constant acceleration, $a_y$, as determined from the following expression:

$$a_y = (n^2)(W^2)[a_{ymax}/(n_{max}^2)(W_{max}^2)(W_{max}^2)]$$

where:

$n$ = a number of writing lasers used in printing a swath, $W$ = a rotational speed of the writing drum in RPM, $W_{max}$ = a maximum rotational speed of the writing drum (RPM), $n_{max}$ = a maximum number of lasers writing lasers (excluding dummy lasers), and $a_{ymax}$ = a characteristic physical limit of a system for rotating the translation means.

16. The method of claim 10 wherein in performing step (d) starting the printing of the color dots in response to a detection of an initial transition of the next pulse from the second encoder coupled to the writing drum.

17. The method of claim 10 comprising the further steps of:

(e) prior to performing step (a), mounting a receiver member on the writing drum, and a dye donor member containing a predetermined dye color on top of the receiver member, while the writing drum and translation means are stationary.

18. A method of printing color dots on a multicolor proof with a thermal printer comprising a rotatable writing drum and a writing head which is coupled to a translation means for moving the writing head comprising the steps of:

(a) mounting a receiver member on the writing drum and a dye donor member containing a predetermined dye color on top of the receiver member while the writing drum and translation means are stationary;

(b) activating the translation means for moving the writing head in a reverse direction normal to a rotation of the writing drum until the writing head reaches a predetermined first "start" position;;

(c) activating the translation means for moving the writing head in a forward direction opposite to the reverse direction in response to the writing head reaching the predetermined first "start" position in step (b);

(d) detecting when the writing head reaches a predetermined second "start" position;

(e) detecting a next pulse from a first radial position encoder coupled to the translation means after the writing head is detected as reaching the predetermined second "start" position in step (d) indicating that the writing head has reached a "home" position, and simultaneously therewith deactivating the translation means for stopping the movement of the translation means and the writing head, where the first radial position encoder produces a first predetermined plurality of pulses per revolution of the translation means;

(f) accelerating the writing drum with a first predetermined substantially constant acceleration until a first predetermined velocity is reached in response to a receipt of the next pulse from the first radial position encoder coupled to the translation means in step (e);

(g) accelerating the translation means with a second predetermined substantially constant acceleration until a second predetermined velocity is reached in response to the writing drum reaching the first predetermined velocity;

(h) selectively energizing a predetermined number of thermal elements in the writing head for starting the printing of color dots of the dye color on the dye donor member onto the receiver member in response to step (g); and (i) repeating steps (a) through (h) to each of the other dye colors needed to print the multicolor proof.

19. The method of claim 18 wherein in performing step (b), performing the substeps of:

(b1) moving the writing head in a reverse direction towards the first predetermined "start" position;

(b 2) sensing when the writing head has reached the first predetermined "start" position using an optical sensor positioned at a predetermined location along a travel of the writing head; and (b3) moving the writing head in the forward direction until the home position is reached.

20. The method of claim 19 wherein in performing the substeps of:

(i) moving the writing head in the reverse direction until an optical path of the optical sensor is blocked by an extension protruding from the writing head; and (ii) moving the writing head in the forward direction in response to the optical path of the optical sensor being blocked in step (i) until the optical path of the optical sensor is no longer blocked for sensing that the writing head has reached the predetermined second "start" position.

21. The method of claim 19 wherein in performing step (b3), moving the writing head with a creeping velocity.

22. The method of claim 18 wherein in performing step (b) rotating the writing drum with the first predetermined substantially constant acceleration, $a_x$, as determined from the following expression:

$$a_x = \frac{(W/W_{max})^2[nR_d a_{xmax} a_{ymax} F_p]}{[nR_d F_p a_{ymax}] + [2nR_t F_s n_{max} a_{xmax}] - [2R_t F_s n_{max}^2 a_{xmax}]}$$

where:

n = a number of writing lasers used in the writing head in a swath, $n_{max}$ = a maximum number of writing lasers mounted in the writing head (exclusive of any dummy lasers), W = a rotational speed of the writing drum in RPM, $R_t$ = a resolution of the first radial position encoder coupled to the translation means in pulses per revolution, $F_s$ = a frequency of the translation means in revolutions per inch of travel of the writing head, $F_p$ = a value for a number of pixels per inch to be printed, $R_d$ = a resolution of a second encoder coupled to the writing drum in pulses per revolution, $a_{xmax}$ = a characteristic physical limit of a system for rotating the writing drum, and $a_{ymax}$ = a characteristic physical limit of a system for rotating the translation means.

23. The method of claim 18 wherein in performing step (g) rotating the translation means with the second predetermined substantially constant acceleration, $a_y$, as determined from the following expression:

$$a_y = (n^2)(W^2)[a_{ymax}/(n_{max}^2)(W_{max}^2)]$$

where:

n = a number of writing lasers used in printing a swath,

W = a rotational speed of the writing drum in RPM, $W_{max}$ = a maximum rotational speed of the writing drum (RPM), $n_{max}$ = a maximum number of lasers writing lasers (excluding dummy lasers), and $a_{ymax}$ = a characteristic physical limit of a system for rotating the translation means.

24. The method of claim 18 wherein in performing step (h), starting the printing of the color dots in response to a detection of an initial transition of the next pulse from a second radial position encoder coupled to the writing drum after the translation means reached the second predetermined velocity in step (g), where the second radial position encoder produces a second predetermined plurality of pulses per revolution of the writing drum.

* * * * *

UNITED STATES PATENT AND TRADEMARK OFFICE
CERTIFICATE OF CORRECTION

PATENT NO. : 5,262,937
DATED : November 16, 1993
INVENTOR(S) : Thomas A. Mackin, et al It is certified that error appears in the above-indentified patent and that said Letters Patent is hereby corrected as shown below:

```
Col. 17, line 28, delete "translation means." and insert
-- writing drum, and
aymax = a characteristic physical limit of a system for
rotating the translation means. --
```

Signed and Sealed this

Twenty-fourth Day of May, 1994

Attest:

BRUCE LEHMAN

Attesting Officer

Commissioner of Patents and Trademarks